United States Patent
Ma et al.

(10) Patent No.: US 9,973,365 B2
(45) Date of Patent: May 15, 2018

(54) METHOD AND SYSTEM FOR COMBINING DFT-TRANSFORMED OFDM AND NON-TRANSFORMED OFDM

(71) Applicant: Apple Inc., Cupertino, CA (US)

(72) Inventors: Jianglei Ma, Kanata (CA); Wen Tong, Ottawa (CA); Ming Jia, Ottawa (CA); Hua Xu, Nepean (CA); Peiying Zhu, Kanata (CA); Hang Zhang, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/195,083

(22) Filed: Jun. 28, 2016

(65) Prior Publication Data

US 2016/0308702 A1    Oct. 20, 2016

Related U.S. Application Data

(60) Continuation of application No. 14/251,629, filed on Apr. 13, 2014, now Pat. No. 9,407,487, which is a
(Continued)

(51) Int. Cl.
| | |
|---|---|
| *H04L 27/26* | (2006.01) |
| *H04L 1/00* | (2006.01) |
| *H04L 5/00* | (2006.01) |

(52) U.S. Cl.
CPC .......... *H04L 27/263* (2013.01); *H04L 1/0003* (2013.01); *H04L 5/0007* (2013.01);
(Continued)

(58) Field of Classification Search
USPC .......................................... 375/295; 370/329
See application file for complete search history.

(56) References Cited

U.S. PATENT DOCUMENTS

| | | |
|---|---|---|
| 5,390,676 A | 2/1995 | Katakura |
| 7,028,246 B2 | 4/2006 | Kim et al. |

(Continued)

FOREIGN PATENT DOCUMENTS

| | | |
|---|---|---|
| CA | 2402011 A1 | 9/2001 |
| CA | 2537534 | 3/2005 |

(Continued)

OTHER PUBLICATIONS

International Search Report for corresponding PCT/CA2006/000464, dated Jul. 14, 2006, 3 pages.
(Continued)

*Primary Examiner* — Eva Puente
(74) *Attorney, Agent, or Firm* — Meyertons, Hood, Kivlin, Kowert & Goetzel, P.C.

(57) ABSTRACT

Methods and systems are provided that enable an OFDM transmitter to be used for transmitting conventional OFDM or a form of transformed OFDM. A technique is provided for transforming a coded and modulated sequence of samples prior to an IFFT that enables the transformed sequence of samples to be transmitted using conventional OFDM or transformed OFDM. The selection of a transform function for transforming the coded and modulated sequence of samples may be based on optimizing the transform function for particular operating conditions between the transmitter and receiver. In some embodiments of the invention OFDM and time transformed OFDM are multiplexed in time and/or frequency in a transmission frame. In some embodiments of the invention a pilot pattern is provided in which the pilot are sent using OFDM and data is sent using OFDM and/or transformed OFDM.

20 Claims, 11 Drawing Sheets

Related U.S. Application Data division of application No. 13/047,259, filed on Mar. 14, 2011, now Pat. No. 8,773,974, which is a division of application No. 11/909,567, filed as application No. PCT/CA2006/000464 on Mar. 30, 2006, now Pat. No. 7,929,407.

(60) Provisional application No. 60/674,878, filed on Apr. 26, 2005, provisional application No. 60/666,548, filed on Mar. 30, 2005.

(52) U.S. Cl.
CPC ...... *H04L 27/2628* (2013.01); *H04L 27/2634* (2013.01); *H04L 27/2646* (2013.01); *H04L 1/0009* (2013.01); *H04L 5/0023* (2013.01); *H04L 5/0044* (2013.01); *H04L 5/0096* (2013.01); *H04L 27/2613* (2013.01)

(56) References Cited

U.S. PATENT DOCUMENTS

| | | |
|---|---|---|
| 7,269,782 B2 | 9/2007 | Kim et al. |
| 7,623,442 B2 | 11/2009 | Laroia et al. |
| 7,813,261 B2 | 10/2010 | Ma et al. |
| 2002/0034161 A1 | 3/2002 | Deneire et al. |
| 2002/0159422 A1 | 10/2002 | Li et al. |
| 2004/0001429 A1 | 1/2004 | Ma et al. |
| 2004/0178934 A1 | 9/2004 | Balakrishnan et al. |
| 2004/0190636 A1 | 9/2004 | Oprea |
| 2004/0190640 A1 | 9/2004 | Dubuc et al. |
| 2004/0246998 A1 | 12/2004 | Ma et al. |
| 2005/0063378 A1 | 3/2005 | Kadous |
| 2006/0245346 A1 | 11/2006 | Bar-Ness et al. |
| 2007/0274252 A1 | 11/2007 | Zhang et al. |
| 2008/0002619 A1 | 1/2008 | Tujkovic et al. |
| 2008/0317148 A1 | 12/2008 | Murakami et al. |
| 2009/0028258 A1 | 1/2009 | Ma et al. |
| 2009/0285163 A1 | 11/2009 | Zhang et al. |
| 2010/0110982 A1 | 5/2010 | Roh et al. |
| 2011/0228878 A1* | 9/2011 | Sorrentino ............ H04L 5/0007 375/295 |
| 2014/0119309 A1* | 5/2014 | Noh .................. H04W 72/0413 370/329 |

FOREIGN PATENT DOCUMENTS

| | | |
|---|---|---|
| CN | 1448015 A | 10/2003 |
| EP | 1198100 | 4/2002 |
| WO | 0205506 A2 | 1/2002 |
| WO | 2004004269 | 1/2004 |
| WO | 2005022811 | 3/2005 |
| WO | 2006014143 A1 | 2/2006 |

OTHER PUBLICATIONS

Sathananthan, K. et al., "Adaptive transform scheme to reduce PAR of an OFDM signal", 15th IEEE International Symposium on Personal, Indoor and Mobile Radio Communications, Sep. 5-8, 2004, PIMRC 2004.

Guangliang, R. et al., "A complementary clipping transform technique for the reduction of peak-to-average power ratio of OFDM system", IEEE Transactions on Consumer Electronics, Nov. 2003, val. 49, Issue 4, pp. 922-926.

Myonghee, P. et al., "PAPR reduction in OFDM transmission using Hadamard transform", 2000 IEEE International Conference on Communications, New Orleans, LA, U.S.A., Jun. 18, 2000-Jun. 22, 2000, ICC 2000, vol. 1, pp. 430-433.

Dlugaszewski, Z. et al., "WHT/OFDM—an improved OFDM transmission method for selective fading channels", Symposium on Communication and Vehicular Technology, Leuven, Belgium, 2000, SCVT-2000, pp. 144 to 149.

Office Action from Chinese Application No. 201110120817.9, dated Dec. 30, 2014, English and Chinese versions, pp. 1-28.

Office Action from Chinese Application No. 201310048966.8, dated Apr. 27, 2015, English and Chinese versions, pp. 1-10.

English Translation of Chinese Office Action for corresponding Chinese Application No. 200680017818.8, dated Nov. 2, 2010, 6 pages.

International Search Report in corresponding Application No. PCT/CA2006/000463, dated Jul. 14, 2006, pp. 2-3.

Extended Search Report in European Patent Application No. 06721728.1-1851 | 1867085, dated Apr. 18, 2013, pp. 1-9.

Notification of Reexamination, Chinese Application No. 201110120817.9, dated Jul. 31, 2015, 25 pages.

\* cited by examiner

METHOD AND SYSTEM FOR COMBINING DFT-TRANSFORMED OFDM AND NON-TRANSFORMED OFDM

PRIORITY CLAIM INFORMATION

This application is a continuation of U.S. patent application Ser. No. 14/251,629, filed Apr. 13, 2014, titled "Method and System for Combining OFDM and Transformed OFDM", by Jianglei Ma, Wen Tong, Ming Jia, Hua Xu, Peiying Zhu, Hang Zhang, which is divisional of U.S. patent application Ser. No. 13/047,259, filed Mar. 14, 2011, titled "Method and System for Combining OFDM and Transformed OFDM" (issued as U.S. Pat. No. 8,773,974 on Jul. 8, 2014), which is a divisional of U.S. patent application Ser. No. 11/909,567, filed Sep. 24, 2007 (issued as U.S. Pat. No. 7,929,407 on Apr. 19, 2011), titled "Method and System for Combining OFDM and Transformed OFDM", which is a U.S. National Stage application of International Application No. PCT/CA2006/000464, filed Mar. 30, 2006, titled "Method and System for Combining OFDM and Transformed OFDM", which claims the benefit of priority to:

U.S. Provisional Application No. 60/674,878, filed Apr. 26, 2005, titled "MIMO-OFDM Air Interface", and U.S. Provisional Application No. 60/666,548, filed Mar. 30, 2005, titled "MIMO-OFDM Air Interface".

All of the above identified Applications are incorporated by reference in their entireties as though fully and completely set forth herein.

FIELD OF THE INVENTION

The invention relates to the field of wireless communications, more specifically to systems and methods employing orthogonal frequency division multiplexed (OFDM) transmission.

BACKGROUND OF THE INVENTION

Orthogonal frequency division multiplexing (OFDM) is a particular form of frequency division multiplexing that distributes data over a number of carriers that have a very precise spacing in the frequency domain. The precise spacing and partially overlapping spectra of the carriers provides several benefits such as high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless metropolitan area networks (MAN). Wireless MAN are networks to be implemented over an air interface for fixed, portable, and mobile broadband access systems.

In another type of frequency division multiplexing, rather than using closely spaced frequencies of OFDM, the spectra of adjacent channels are more or less distinct, and bandpass filtering is typically employed to separate channels. This will be referred to as "conventional frequency division multiplexing".

Orthogonal frequency division multiplexing is beneficial in that multiple input multiple output (MIMO) and collaborative MIMO transmission schemes are easily implemented thereon. Furthermore, the use of orthogonal frequency division multiplexing allows for flexible and efficient pilot designs. Also, problems related to noise enhancement can be avoided during signal processing at the receiver.

The use of conventional frequency division multiplexing has a lower Peak to Average Power Ratio (PAPR). A disadvantage is that it causes noise enhancement.

SUMMARY OF THE INVENTION

According to one broad aspect, the invention provides a method comprising, within an available spectral resource: transmitting with OFDM multiplexing on selected sub-carriers and selected OFDM transmission durations; transmitting with T-OFDM (transformed OFDM) multiplexing or direct multiple sub-carrier multiplexing on selected sub-carriers and selected OFDM transmission durations that do not overlap with OFDM transmissions.

In some embodiments, transmitting with OFDM multiplexing and transmitting with T-OFDM multiplexing comprises: transmitting a respective signal from each of a plurality of antennas, each signal comprising OFDM multiplexing or T-OFDM multiplexing. In some embodiments, transmitting a respective signal from each of a plurality of antennas, each signal comprising OFDM multiplexing or T-OFDM multiplexing comprises using a distinct frequency resource for each transmitter.

In some embodiments, transmitting a respective signal from each of a plurality of antennas comprises transmitting from a plurality of transmitters.

In some embodiments, transmitting a respective signal from each of a plurality of antennas comprises transmitting from a single transmitter.

In some embodiments, transmitting a respective signal from each of a plurality of antennas, each signal comprising OFDM multiplexing or T-OFDM multiplexing comprises transmitting a respective signal from each of a plurality of transmit antennas using common frequency resources for at least two antennas such that MIMO processing will be required to separate the signals upon receipt.

In some embodiments, transmitting a respective signal from each of a plurality of antennas comprises transmitting from a single transmitter.

In some embodiments, transmitting a respective signal from each of a plurality of antennas comprises transmitting from a plurality of transmitters so as to implement a virtual MIMO transmission.

In some embodiments, the method as summarized above further comprises: mapping symbols to the selected sub-carriers for OFDM multiplexing using a sub-band mapping or a diversity mapping; transforming symbols to be transmitted with T-OFDM to produce transformed symbols and mapping the transformed symbols to the selected sub-carriers for T-OFDM using a sub-band mapping or a diversity mapping.

In some embodiments, transmitting from a single transmitter comprises: transmitting with OFDM multiplexing during selected OFDM transmission durations; transmitting T-OFDM multiplexing during OFDM transmission durations distinct from the OFDM transmissions used for OFDM multiplexing.

In some embodiments, transmitting with OFDM multiplexing and T-OFDM multiplexing comprises: for each of at least one frequency resource allocation consisting of a plurality of subcarrier frequencies: selecting transmitting using OFDM multiplexing and transmitting using T-OFDM multiplexing.

In some embodiments, the at least one frequency resource allocation comprises a plurality of resource allocations each consisting of a respective contiguous set of sub-carriers or a distributed set of sub-carriers.

In some embodiments, for each of at least one frequency resource allocation consisting of a plurality of sub-carrier frequencies selecting transmitting using OFDM multiplexing and transmitting using T-OFDM multiplexing comprises: multiplying a respective set of symbols by a selected one of two different transform matrices that result in OFDM multiplexing and T-OFDM multiplexing respectively.

In some embodiments, T-OFDM multiplexing comprises multiplying an input set of symbols by an FFT matrix prior to IFFT processing.

In some embodiments, the method further comprises transmitting pilots.

In some embodiments, the method further comprises transmitting pilots from each antenna on sub-carriers selected from sub-carriers being utilized by that antenna.

According to another broad aspect, the invention provides a multiplexing method comprising: selecting one of at least two transform functions to be a selected transform function; performing the selected transform on a set of input symbols to produce a transformed sequence of samples; performing an inverse fast Fourier transform (IFFT) of the transformed sequence of samples to produce a multiplexer output.

In some embodiments, the two transform functions consist of an identity matrix and a non-identity matrix.

In some embodiments, the non-identity matrix is an FFT matrix, fast Hadamard transform, or a wavelet transform.

In some embodiments, a transmitter is adapted to implement the method as summarized above.

In some embodiments, a plurality of transmitters is adapted to collectively implement the method as summarized above.

In some embodiments, a transmitter is adapted to implement the method as summarized above.

According to another broad aspect, the invention provides a method comprising, within an available spectral resource: adaptively switching between transmitting to a receiver with OFDM multiplexing and transmitting to the receiver with T-OFDM or direct multiple carrier multiplexing.

In some embodiments, adaptively switching between transmitting to a receiver with OFDM multiplexing and transmitting to the receiver with T-OFDM or direct multiple carrier multiplexing comprises: at a transmitter processing each set of symbols by one of two transform functions one of which results in OFDM multiplexing, the other of which results in T-OFDM multiplexing.

In some embodiments, the method further comprises receiving feedback to select which of the two transform functions to use.

In some embodiments, the method further comprises selecting between the two transform functions on the basis of one or more of SNR, traffic type, head room in a power amplifier.

In some embodiments, a transmitter is adapted to implement the method as summarized above.

In some embodiments, the transmitter comprises: a transformer adapted to apply a selected one of the two transform functions to a set of input symbols; an IFFT that receives an output of the transform function.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which.

DETAILED DESCRIPTION OF VARIOUS EMBODIMENTS

Figure 1:
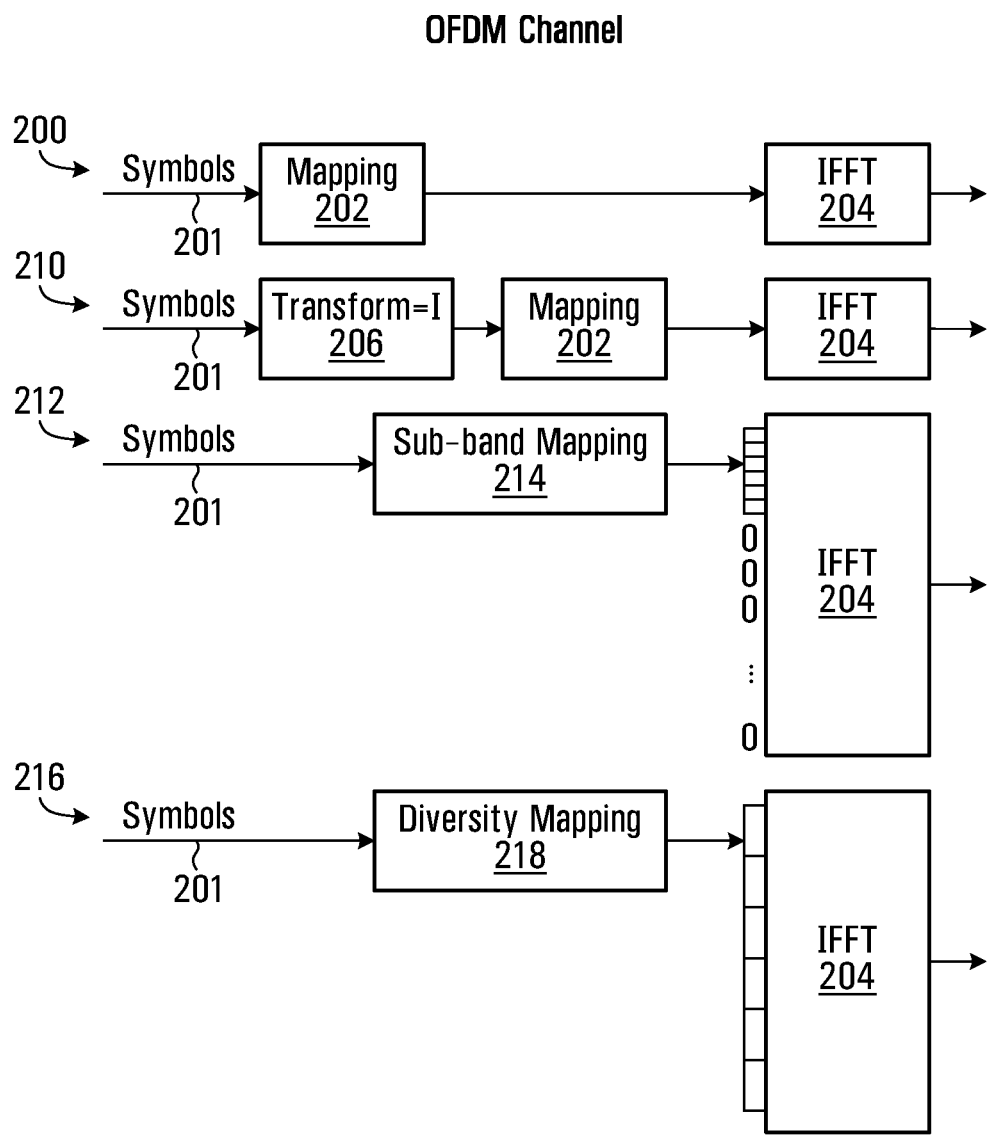
FIG. 1 contains various block diagrams for implementing a first constituent multiplexing method that is equivalent to conventional OFDM.

In OFDM a wideband signal is transmitted on multiple independent parallel narrowband orthogonal carriers. A multicarrier transmitter such as an OFDM transmitter can have a high Peak-to-Average-Power Ratio (PAPR). The OFDM transmitter has a high power amplifier suitable to meet peak power requirements. IFFT (inverse fast Fourier transform) has also been applied to realize orthogonal multiplexing of multiple transmitters.

In conventional FDM (frequency division multiplexing) there is no IFFT processing of a signal before transmission and transmission occurs on a single carrier or multiple separated carriers. In addition, modulation schemes used for single carrier transmitters, such as QAM and QPSK have a smaller dynamic range so the PAPR is smaller than for the OFDM transmitter having a similar transmission range.

An advantage of an OFDM transmitter over a conventional FDM transmitter is a higher spectral efficiency. A disadvantage of an OFDM transmitter as compared to a conventional FDM transmitter is a higher PAPR resulting in a power amplifier in the OFDM transmitter that has a higher cost. OFDM also allows for advanced MIMO applications, flexible and convenient pilot arrangements, and flexible and efficient sub-channelization.

An advantage of a conventional FDM transmitter over an OFDM transmitter is that due to a less noisy output coverage within the cell is better.

When a transmitter is a great distance from a receiver it may be desirable to modify the transmitted signal to improve a signal to noise ratio and reduce a possibility of errors at a receiver end. Conversely, when the transmitter and receiver are in close proximity it may be desirable to modify the transmitted signal to employ a high spectral efficiency.

In some embodiments, methods and systems are provided in which a signal processing step is added to the technique for processing the signal in the OFDM transmitter to enable the signal to be modified before transmission to meet different operating conditions. In some embodiments, a transmitter is equipped to produce a signal that is selectively modified to result in a conventional OFDM signal or in the form of a conventional FDM signal.

In some embodiments, the processing step is a transformation implemented using a transformation function. Depending on the selection of the transformation function for a given implementation, the transformation may produce an output that has transmission characteristics bounded by the transmission characteristics of OFDM and conventional FDM. In some implementations, the processing step may be performed in conjunction with a frequency domain decision feedback equalizer (DFE).

In some embodiments, the transmitter is a mobile terminal while in other embodiments, the transmitter is a base station. The transformation may be particularly useful in a mobile terminal as reducing the PAPR has an effect of reducing an amount of power amplification needed for transmitting a signal. Reducing power amplification may lower energy consumption and lower energy consumption results in a longer battery life for battery powered transmitters.

Embodiments of the invention provide various mechanisms for combining various constituent multiplexing structures consisting of OFDM, transformed OFDM, and direct multiple subcarrier modulation, either by a single transmitter or multiple transmitters.

To begin, three constituent multiplexing structures will be described with reference to FIGS. 1, 2 and 3. FIG. 1 shows a block diagram of a multiplexing structure for generating conventional OFDM channels, generally indicated at 200. Input symbols 201 are fed to a mapping function 202 the output of which is connected to an IFFT 204. The purpose of the mapping function is to map the symbols 201 to particular inputs of the IFFT 204. It is noted that many components might proceed or follow the component shown in FIG. 1, such as coding and modulation, interleaving, or RF up conversion, etc.

Generally indicated at 210 is another multiplexing structure that produces the same output as that of structure 210, namely a conventional OFDM signal output. This includes an additional component 206 which is a transform that performs a transformation on the input symbols 201 before the mapping function 202. However, for an OFDM channel, the transform function is simply equal to an identity matrix, and as such the output of the structure of 210 will be indistinguishable from the output of the structure 200.

A specific example of the mapping function is shown in the structure generally indicated at 212. Here the mapping function is a sub-band mapping 214 that maps the symbols to a contiguous set of sub-carrier frequencies of the IFFT 204.

Generally indicated at 216 is another example of how the mapping might be performed. In this case, the symbols 201 are input to diversity mapping function 218 which maps the symbols to sub-carriers that are distributed across the sub-carrier frequencies being processed in the IFFT 204.

A second constituent multiplexing structure produces a transformed OFDM signal. Referring now to FIG. 2, generally indicated at 219 is a block diagram of a transmitter that generates a transformed OFDM signal. In this case, symbols 201 are input to a transform function 220 the output of which is fed to mapping function 222 the output of which is input to the IFFT 204. The transform 220 performs a transformation on the input symbols 201. The transformation is not simply the identity matrix as was the case in structure 210 of FIG. 1. Specific examples of the transform function include a fast Fourier transform (implemented in any suitable fashion, for example a DFT), a wavelet transform (such as a Harr wavelet transform) or a fast Hadamard transform (FHT). In some implementations the transform function is represented by an invertible matrix. In some implementations the transform function is represented by an orthonormal matrix.

The function of the mapping function 222 and the IFFT 204 is the same as in previous examples. The mapping function 222 maps the outputs of the transform 220 to selected sub-carriers of the IFFT 204.

A first example of the mapping is generally indicated at 221 where the output of the transform 220 is input to a sub-band mapping 224, the result of which is that a contiguous block of sub-carriers of the IFFT 204 are used.

Another example of mapping is shown generally indicated at 223. In this case, the output of the transform 220 is input to a diversity mapping function 226 which maps the transformed output to a set of sub-carriers that are distributed throughout the OFDM band of the IFFT 204.

Figure 2:
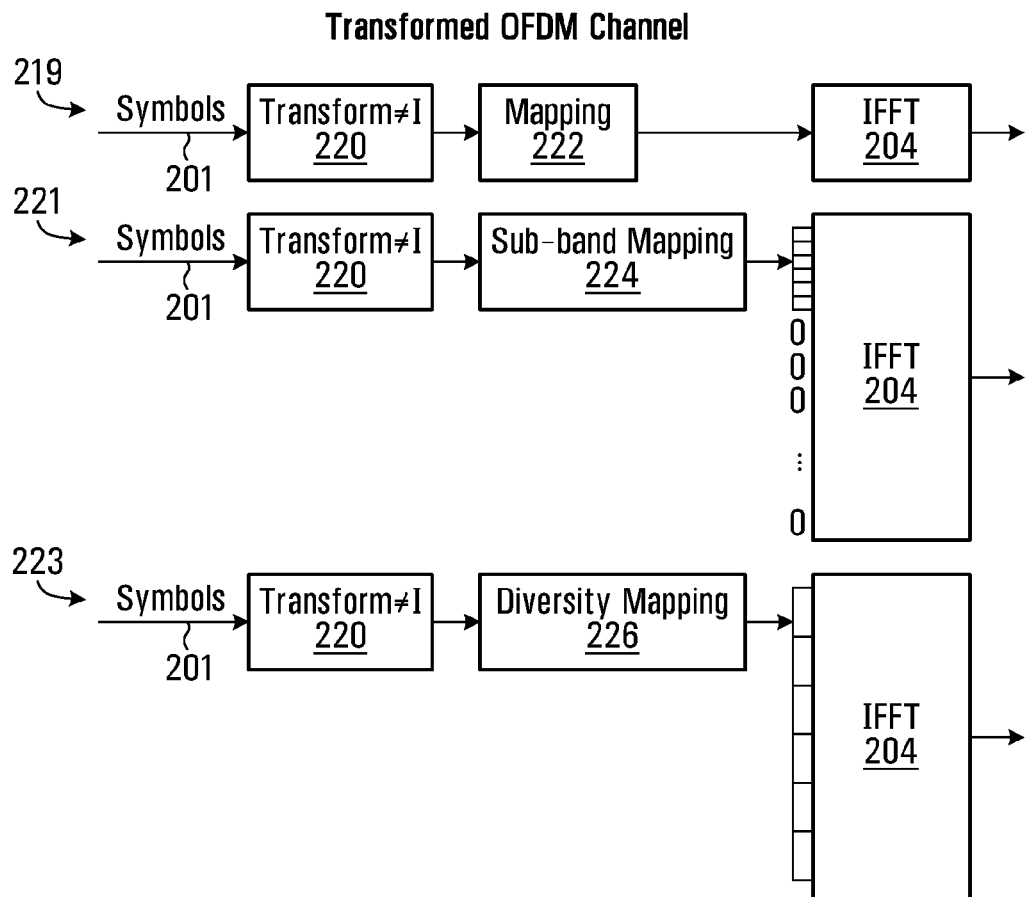
FIG. 2 contains various block diagrams for implementing a second constituent multiplexing method, transformed OFDM.

It is readily apparent how the channel structure of FIG. 1 and the channel structure of FIG. 2 can be implemented using the same physical implementation. In particular, the structure 210 in FIG. 1 and the structure 219 in FIG. 2 are identical with the exception of the fact that a different transform is employed. As such, by dynamically selecting the contents of the transform 220, a channel that is an OFDM channel can be implemented, or a transformed OFDM channel can be implemented. In some embodiments, transmitters are equipped with such a structure to enable them to dynamically select between operating to produce OFDM channels or transformed OFDM channels.

Figure 3:
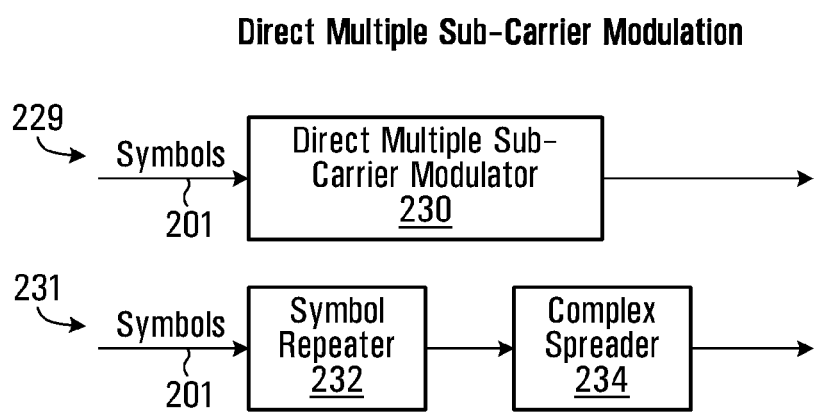
FIG. 3 contains various block diagrams for implementing a third constituent multiplexing method, direct multiple sub-carrier multiplexing.

Referring now to FIG. 3, shown a third constituent channel type that will be referred to as "direct multiple subcarrier multiplexing", generally indicated at 229. In this case, input symbols 201 are input to a direct multiple sub-carrier modulator 230 to produce an output. The modulation is direct in the sense that no IFFT or FFT technology is employed, but rather input symbols are multiplied to particular sub-carriers directly. It is referred to as "multiple" sub-carrier modulation because each input symbol is represented in multiple, in some cases all, of the sub-carriers output by the modulator.

A very specific example is shown generally indicated at 231. In this case, the direct multiple sub-carrier modulator consists of a symbol repeater 232 and a complex spreader 234 that multiplies each repeated symbol by a set of complex frequencies to produce an output. It is noted that the output of the direct multiple sub-carrier multiplexing structure 231 is in some instances mathematically equivalent to the output of the structure 223 of FIG. 2. In particular, when the transform 220 is an FFT (or equivalent) and the diversity mapping 226 maps the output of the transform 220 to a set of sub-carrier locations that are equally spaced, the output is the same as the output of the structure 231 of FIG. 3 where the complex spreader multiplies the repeated symbols by individual sub-carrier frequencies that are the same as the spaced sub-carrier inputs to the IFFT 204 of FIG. 2. A common feature between the schemes of FIGS. 2 and 3 is that each input symbol 201 ends up being represented on multiple sub-carrier frequencies; in contrast, the conventional OFDM structure of FIG. 1 has each symbol 201 appearing on a single sub-carrier.

Having defined the three constituent multiplexing structures, various mechanisms for their co-existence are provided. All such mechanisms involve the co-existence of OFDM and one or more of the other multiplexing approaches, be it transformed OFDM or direct multiple sub-carrier multiplexing. In a particular embodiment, OFDM and transformed OFDM are supported.

Figure 4:
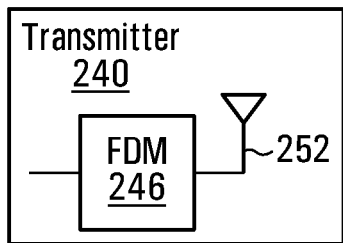
FIG. 4 is a block diagram of a first example of the co-existence of OFDM and transformed OFDM in transmissions from multiple transmitters.
Figure 4:
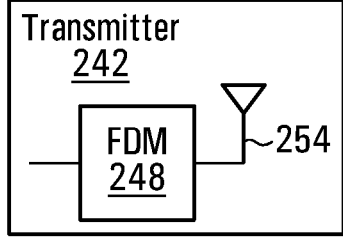
Figure 4:
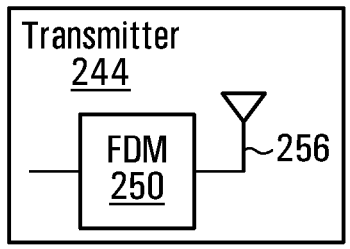

A first example is illustrated in FIG. 4. In this example there is a set of transmitters 240, 242, 244 (only three shown) each of which might for example be a separate mobile station. Each transmitter is equipped with a respective frequency division multiplexer 246, 248, 250 that implements one or more of the three constituent multiplexer structures of FIGS. 1, 2 and 3. Each transmitter has a respective antenna 252, 254, 256. With the embodiment of FIG. 4, the frequency division multiplexers 246, 248, 250 each operates using a respective distinct frequency resource or set of sub-carriers. Given an available set of subcarriers, each transmitter is assigned a different subset of subcarriers and having been assigned that set of sub-carriers, one of the three multiplexer structures are described above is implemented. By separating out the sub-carriers in this manner, the different channel structures can co-exist simultaneously.

Figure 5:
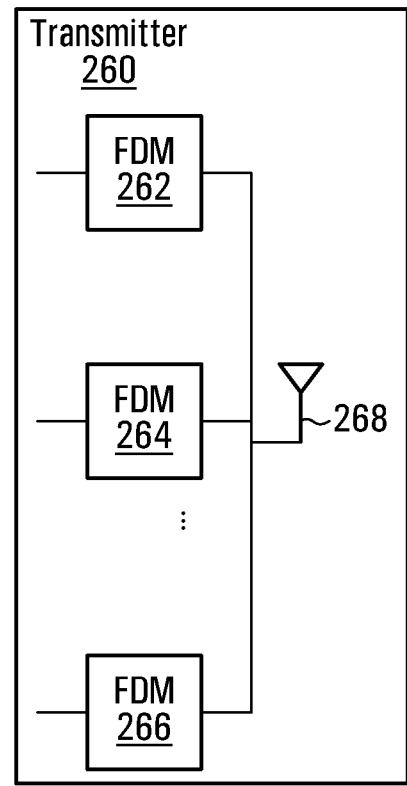
FIG. 5 is a block diagram of a second example of the co-existence of OFDM and transformed OFDM in transmissions a single transmitter.

Another example of the co-existence of these channels will now be described with reference to FIG. 5. Shown is a single transmitter 260 having multiple frequency division multiplexers 262, 264, 266 connected to a single antenna 268. Each frequency division multiplexer 262, 264, 266 implements one of the three constituent multiplexer structures of FIGS. 1, 2 and 3. In this case, the frequency resource is again divided between the different frequency division multiplexers 262, 264, 266 in a manner similar to the distinct transmitters of FIG. 4. Since they are implemented in a single transmitter, if multiple frequency division multiplexers employ IFFT functionality, a single IFFT could be implemented for these in combination. Similarly, mapping could be performed with a single mapper.

Figure 6:
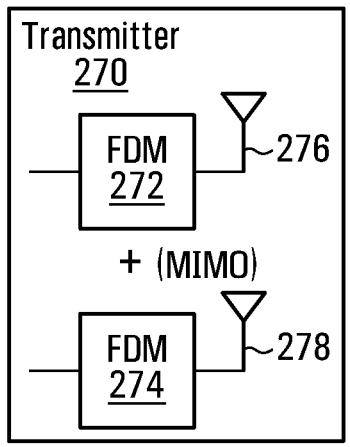
FIG. 6 is a block diagram of a third example of the co-existence of OFDM and transformed OFDM in MIMO transmissions of a single multiple transmitter.

Referring now to FIG. 6, shown is another example of how the different channel structures can be combined. With the example of FIG. 6, a transmitter generally indicated at 270 has frequency division multiplexers 272, 274, and output antennas 276, 278. Each frequency division multiplexer 272, 274 implements one of the three constituent multiplexer structures of FIGS. 1, 2 and 3. In this case, the two frequency division multiplexers 272, 274 are not assigned distinct frequency resources as was the case for the example of FIG. 4. Rather, they are assigned a common frequency resource, and MIMO (multiple input, multiple output) processing is performed at the receiver to separate these. With the example of FIG. 6, the approach generalizes to an arbitrary number of transmit antennas for a given MIMO channel. Furthermore, the details are only shown for a single frequency allocation. The structure 270 can be repeated for multiple different transmitters as in the FIG. 4 embodiment, or within a single transmitter as in the FIG. 5 embodiment.

Figure 7:
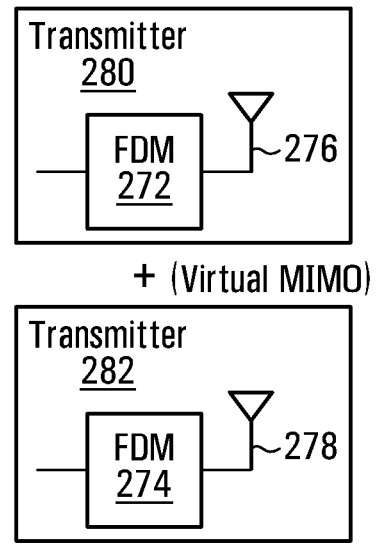
FIG. 7 is a block diagram of a fourth example of the co-existence of OFDM and transformed OFDM in MIMO transmissions of multiple transmitters.

In yet another implementation, generally indicated at FIG. 7, a structure similar to that of FIG. 6 is employed, but in which the frequency division multiplexers 272, 274 are implemented on separate transmitters 280, 282 respectively. In this case, the frequency resources again are common and as such this is referred to as "virtual MIMO", also referred to as collaborative or co-operative MIMO. A receiver of signals transmitted by the transmitters 280, 282 would use MIMO technologies to separate the two transmissions. The structure of FIG. 7 can be repeated for multiple different frequency resource allocations.

With any of the above-described embodiments, the transmitter may operate in an open loop mode in which case there is no feedback input. In other embodiments the transmitter operates in a closed loop mode, for example, a receiver that receives the transmitted signal sends feedback to the transmitter to aid in selecting between the various supported FDM variants, for example by selecting an appropriate transform function.

In some embodiments, the receiver transmits a signal that enables the transmitter to determine a distance between the transmitter and receiver or to determine an SNR and an available power margin. The receiver may transmit information that would enable the transmitter to determine a bit error rate (BER), a signal to noise ratio (SNR) or a channel quality estimate. The transmitter may be able to determine whether there is any power head room to increase power for a given user if signal quality needs to be improved. If there is no such room, then an option is to switch to T-OFDM to reduce PAPR so that power can be increased. Based on these determinations the transmitter may select a transform function to modify a coded and modulated signal to improve coverage within the cell by transmitting the transformed signal as transformed OFDM. Conversely, when the transmitter determines from information provided by the receiver that operating conditions are favorable, for example close proximity of the transmitter and receiver or favorable transmission parameters, i.e. BER, SNR the transmitter may select a transform function to modify the transmitted signal to employ a high spectral efficiency capacity by transmitting the transformed signal as OFDM.

In some embodiments, the transform function is an FFT. The transform function in the form of an FFT may be more efficiently computed using a DFT (discrete Fourier transform) when the number of samples is a power of 2, but more generally, any approach to computing the FFT can be employed. The size of the DFT depends on the bandwidth assigned for a given user. The DFT approach will be assumed in the following specific example. When the DFT is performed on a single data point (essentially an impulse in the time domain), the result is substantially the same as conventional OFDM, which is distributed over all sub-carriers in the transmission band. When multiple coded and modulated signals are each transformed using a DFT smaller than the size of the IFFT the outputs of the respective DFTs can be mapped to locations in the IFFT input so as to be processed by the IFFT simultaneously for multi-user signal multiplexing.

An example of a transform function that includes a DFT is shown below in which the DFT is a two sample point DFT represented by the 2×2 matrix [M] within transform function T. The remainder of the elements in the primary negative sloping diagonal are each equal to one and all other elements in the matrix equal zero. This type of transform could be used to transform two symbol sequences simultaneously in a single transmitter with one sequence being transformed OFDM and the other conventional OFDM. Alternatively, the transform could be viewed as the sum of two transformations performed by separate transmitters.

$$T = \begin{bmatrix} M_{1,1} & M_{1,2} & 0 & \cdots & 0 \\ M_{2,1} & M_{2,2} & 0 & \ddots & \vdots \\ 0 & 0 & \ddots & \ddots & 0 \\ \vdots & \ddots & \ddots & 1 & 0 \\ 0 & \cdots & 0 & 0 & 1 \end{bmatrix}$$

After the coded and modulated output is multiplied by such a transform, the transformed output is then input to the IFFT function as before. Different transform functions can be selected for different users.

In some implementations each coded and modulated input is transformed with a particular transform function. In some implementations the coded and modulated inputs can be collectively transformed by a single transform function as in the above example matrix. The number of coded and modulated signals is implementation specific depending on a desired number of users per transmitter.

In some embodiments, the manner by which the overall bandwidth is subdivided between the different constituent multiplexer types used is updated dynamically, for example every scheduling period.

In some embodiments of the invention a transform function is a parameterized transform function. The parameterized transform function may be for example a parameterized orthonormal matrix, for example a Teoplitz matrix as shown below, where the variables a and b are constant values along negative-sloping diagonals.

$$T = \begin{bmatrix} 1 & a & b & \cdots & 0 \\ a & 1 & a & \ddots & \vdots \\ b & a & \ddots & \ddots & b \\ \vdots & \ddots & \ddots & 1 & a \\ 0 & \cdots & b & a & 1 \end{bmatrix}$$

In some embodiments the parameterized transform function is used for partial response signaling (PRS) in which a controlled amount of inter-symbol interference (ISI) is permitted. As the amount of ISI is known, the effect of the ISI can be compensated.

In some embodiments of the invention the transform function is generated as a function of a desired performance criterion. For a given transform function, a function is created, namely Q(T). In some embodiments the function Q(T) is used in combination with the transform function to optimize particular performance criteria, for example minimum mean square error (MMSE) or minimum bit error rate (BER) at a receiver output.

In some embodiments the transform function may be generated by a relation between the transform function T and the function of transform function T, Q(T) as $\min \|TQ(T)-I\|^2$.

In some embodiments the function Q(T) has matrix algebraic form representation. In some embodiments the function Q(T) is a minimization procedure, for example a Viterbi trellis search.

In some embodiments, to an embodiment of the invention: T=Q(H), where H is the channel matrix. Transform T may be used for channel decomposition, where $(.)^H$ represents the Hermitian:

$$H = U \Lambda V \quad Q(H) = U^H$$

This can be employed to provide channel pre-equalization and pre-distortion transmission.

In some embodiments, the generation of the transform function may include the generation of a family of transform functions.

In some implementations of the invention the transform function is selected to maximize the receiver output signal to noise ratio. In some implementations of the invention the transform function is selected to minimize the PAPR. In some embodiments the transmitter selects the parameters of the transform function based on several criteria, such as minimizing the PAPR and/or minimizing the MMSE.

In some embodiments of the invention the receiver may provide feedback to the transmitter to facilitate the selection of the transform function. If the receiver is aware of which transform function is being used by the transmitter the receiver is able to receive and detect the transformed sequence of samples when they arrive at the receiver. In some embodiments of the invention, when the receiver is not involved in selection of the transform function, the transmitter sends an identification to the receiver of the particular transform function used in generating the output transmitted by the OFDM transmitter.

In some embodiments the transmitter dynamically and/or adaptively optimizes the transform function for particular operating conditions. In some embodiments of the invention, there is provided a mechanism that allows adaptive and dynamic optimization of the transform function to optimize both transmitter and receiver performance.

In some embodiments of the invention the use of an appropriate transform function reduces the PAPR for low power devices.

Various specific examples will now be described with reference to FIGS. 8 to 14.

Figure 8:
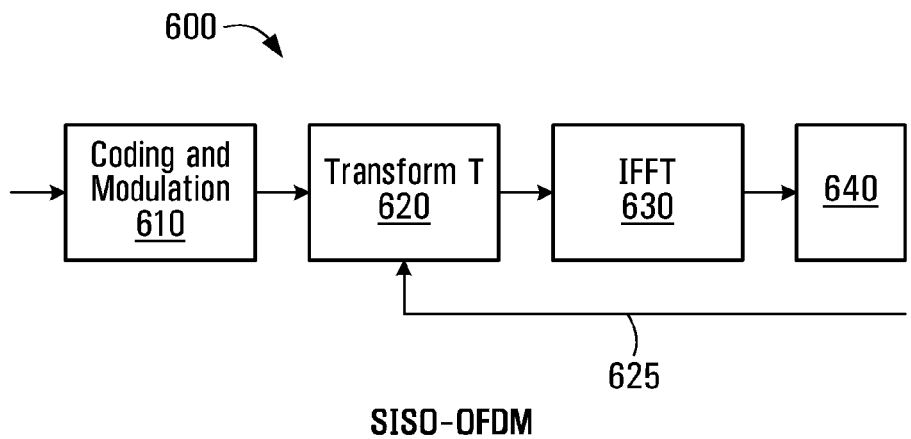
FIGS. 8 and 9 are block diagrams of OFDM transmitters according to embodiments of the invention.

Referring now to FIG. 8 shown is an example of a single input single output (SISO) OFDM transmitter, generally indicated at 600 that is enabled to perform the transform on a sequence of samples in accordance with an embodiment of the invention. The sequence of samples is provided to coding and modulation logic 610. An output sequence of symbols of the coding and modulation logic 610 is provided to transform function 620. An output of the transform function 620 is provided to an IFFT function 630. The output of the IFFT function 630 is then provided to an antenna 640 for transmission.

Figure 9:
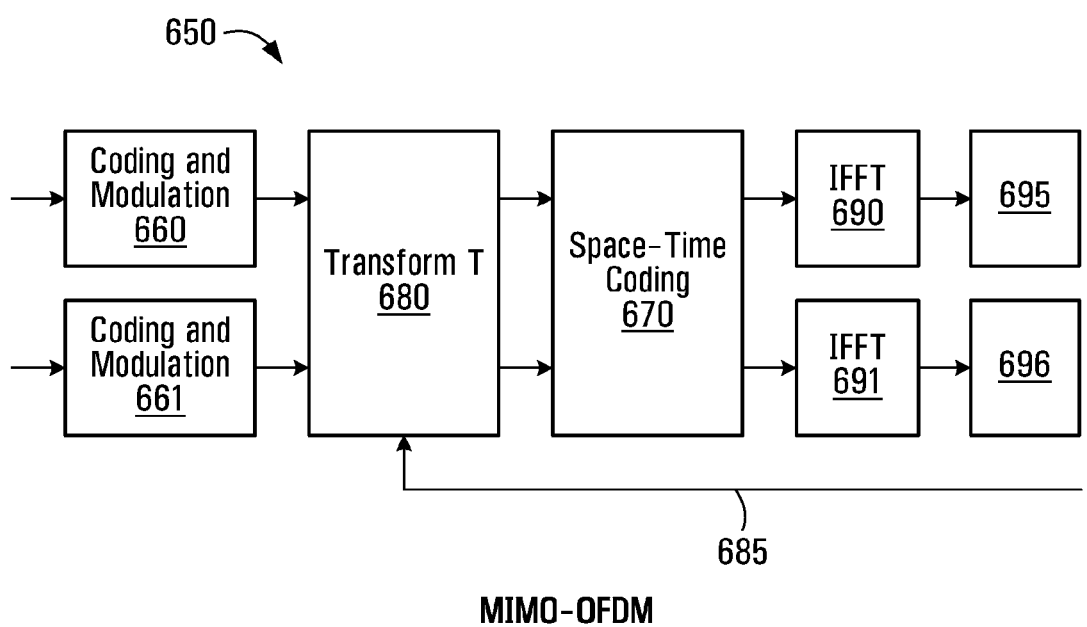

FIG. 9 shows an example of a multiple input multiple output (MIMO) OFDM transmitter, generally indicated at 650 that is enabled to perform the transform in accordance with an embodiment of the invention. In the MIMO OFDM transmitter 650 two portions of a bit stream a single user (not shown) are provided to respective coding and modulation function 660, 661. Respective outputs of the coding and modulation functions 660, 661 are provided to transform 680. The output of the transform 680 is input to a space-time coding function 670 that produces a respective output for each of two IFFTs 690, 691. The outputs of the IFFTs 690, 691 are output on antennas 695, 696. With the example of FIG. 9, the transform 680 contains a sub-matrix for each of the two inputs from coding and modulation. If the sub-matrix is an identity matrix, then OFDM is used for that input. If the sub-matrix is a non-identity transformation, then transformed OFDM is used for that input.

The example of FIG. 9 also includes space-time coding function 670 to achieve spatial diversity. Any of the multi-antenna transmitter embodiments may be further supplemented with space-time coding to provide for spatial diversity.

Except for the transform function 620, 680, the components of the OFDM transmitters of FIGS. 8 and 9 can be defined in an implementation specific manner as would be understood by one skilled in the art. In a specific example, these can be configured to operate in a similar manner to various components of the transmitter described below with reference to FIG. 18.

FIG. 9 illustrates a two antenna, single user implementation, but it is to be understood that there may be any number of antennas and corresponding coding and modulation blocks.

The transform function 620,680 in FIGS. 8 and 9 are each shown to have an additional input indicated by 625 and 685, respectively. In some embodiments these respective inputs are used to provide feedback to the transform function 620,680 for selection of the transform function in a dynamic fashion.

The examples of FIGS. 8 and 9 only implement the constituent multiplexers of FIGS. 1 and 2 (OFDM and T-OFDM), but not the constituent multiplexer of FIG. 3 (direct multiple subcarrier modulation). Other permutations are possible.

A mathematical representation of processing performed by the OFDM transmitter can express each block of FIGS. 8 and 9 as a matrix. The particular transform is selected to enable the OFDM transmitter to transmit the sequence of samples as ODFM or transformed OFDM on a per user basis.

If the entire content is to be transmitted using OFDM, then the transform function T is selected to be the identity matrix shown below, in which elements along a primary negative sloping diagonal are each equal to one and all other elements in the matrix equal zero.

$$T = \begin{bmatrix} 1 & 0 & \cdots & 0 & 0 \\ 0 & 1 & \cdots & 0 & 0 \\ \vdots & \vdots & \ddots & \vdots & \vdots \\ 0 & 0 & \cdots & 1 & 0 \\ 0 & 0 & \cdots & 0 & 1 \end{bmatrix}$$

Using the identity matrix as the transform function results in an output from the OFDM transmitter being that of a conventional OFDM signal. Using the identity matrix is substantially the same as if no transform were performed in the OFDM transmitter.

For the FIG. 8 example, the user of the identity matrix for the transform T 620 results in the single coded and modulated output being transmitted using the entire set of OFDM sub-carriers or an assigned sub-set thereof, be that a sub-band set of sub-carriers or a diversity set of sub-carriers. For the FIG. 9 example, this results in the two coded and modulated outputs sharing a set of OFDM sub-carriers on two antennas.

In the opposite extreme, the transform function can be selected to be a fast Fourier transform (FFT) performed on the entire sequence of input symbols. When the FFT has an equal number of samples used by the IFFT functions following the transform, the OFDM transmitter output is a single carrier conventional FDM transmission. In the particular case where the number of samples in the FFT and that used by the IFFT functions is the same the FFT and the IFFT are opposite transforms. The result of performing the two transforms is substantially the same as if neither of the two transforms were performed on the sequence of samples.

For the FIG. 8 example, the user of a full sized FFT for the transform T 620 results in the single coded and modulated output being transmitted as if it were a single carrier transmission. FIG. 9 differs from FIG. 8 in that the output is a MIMO transmission.

For single user implementations, the mode change can be based on feedback from the receiver, or be made autonomously at the transmitter. In some embodiments, the mode is adaptively changed and/or the transform function is selected as a function of one or more of:

SNR—this is really a function of the distance between the receiver and the transmitter;

traffic type—e.g. control channel may need a better channel/performance;

head room at the power amplifier in the transmitter as discussed previously.

Figure 10:
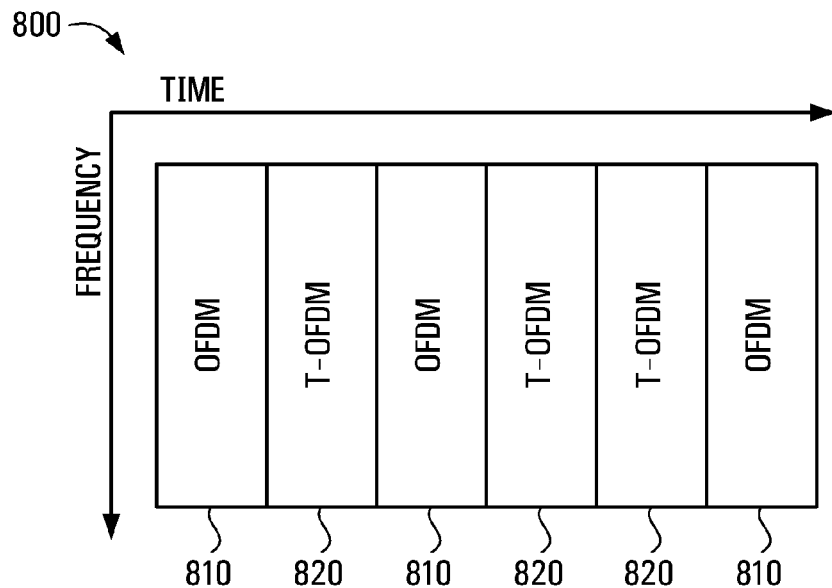
FIG. 10 is a schematic diagram of a transmission frame according to an embodiment of the invention.

Referring now to FIG. 10, shown is an example frame 800 structure in which during a given OFDM symbol duration, only one of the multiplexing structures are employed, but within a frame consisting of a set of such OFDM durations multiple multiplexing structures are employed. The frame structure has a two dimensional appearance which is represented as collection of adjacent columns 810,820. The vertical direction represents a transmission band in the frequency domain and the horizontal direction represents time slots in the time domain. In the example of FIG. 10, the frame 800 is divided into OFDM time slots 810 that are used for OFDM, and time slots 820 that are used for T-OFDM. A similar frame (not shown) could be implemented to divide the frame into OFDM time slots and slots containing direct multiple sub-carrier multiplexing and/or slots containing conventional FDM signals.

The size of the transmission band, the duration of the time slots and the number of time slots in the frame are all implementation specific parameters. The assignment of the time slots to the various constituent multiplexing types is also implementation specific, can take any desired arrangement. In some embodiments, the arrangement of time slots can vary from frame to frame. In other embodiments consecutive frames may transmit the same arrangement of time slots. FIG. 10 can be implemented using some of the transmitter structures described previously such as the structures of FIGS. 8 and 9.

Figure 11:
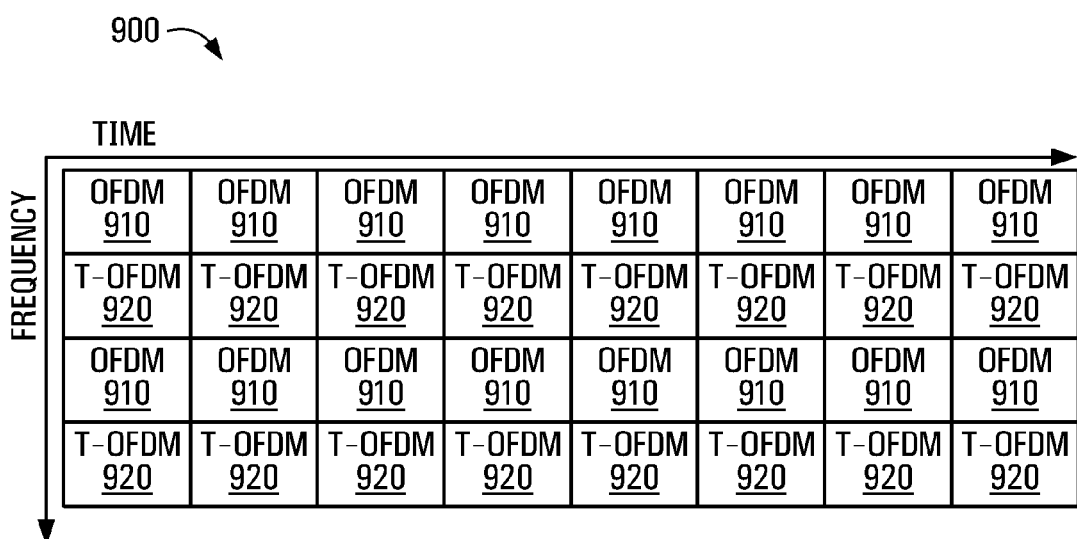
FIG. 11 is a schematic diagram of a transmission frame according to another embodiment of the invention.

FIG. 11 shows an example frame 900 used in accordance with some embodiments of the invention. The frame has a two dimensional orientation similar to FIG. 10 in which time is represented in the horizontal direction and frequency in the vertical direction. In FIG. 11, in each time slot, the transmission band is segmented into logical clusters or sub-bands 910, 920. In the illustrated example, each cluster consists of contiguous sub-carriers. The clusters are shown to be of two different types, that is OFDM clusters 910 and T-OFDM clusters 920. In some embodiments, the clusters include one or more logical sub-channels, where each sub-channel is a designated grouping of active sub-carriers. An OFDM cluster is a grouping of sub-carriers that each provide a narrowband frequency component of a transmitted signal in a particular time slot. A T-OFDM cluster is a grouping of sub-carriers that collectively provide a wideband frequency sub-band representation of a transmitted signal in a particular time slot.

There are shown to be four clusters in each time slot of the example of FIG. 11, but the number of clusters in the transmission band and the number of active sub-carriers in each cluster are implementation specific parameters. Furthermore, the size of the transmission band, the duration of the time slots and the number of time slots in the frame are all implementation specific parameters as well. The assignment of the clusters to OFDM and T-OFDM is also implementation specific, where the assignment of OFDM and T-OFDM clusters can take any desired arrangement. In some embodiments, the arrangement of clusters can vary from frame to frame. In other embodiments consecutive frames may transmit the same arrangement of clusters. In the example of FIG. 11, the two dimensional resource is divided into regions that are used for OFDM, and regions used for transformed OFDM (TOFDM). A similar frame (not shown) could be implemented to subdivide the frame into OFDM regions and regions containing direct multiple sub-carrier multiplexing and/or regions containing conventional FDM signals.

FIG. 11 can be implemented by a multi-carrier OFDM transmitter adapted to transmit both OFDM and transformed OFDM. Examples of such OFDM transmitters are shown in FIGS. 8 and 9 and described above.

Figure 12:
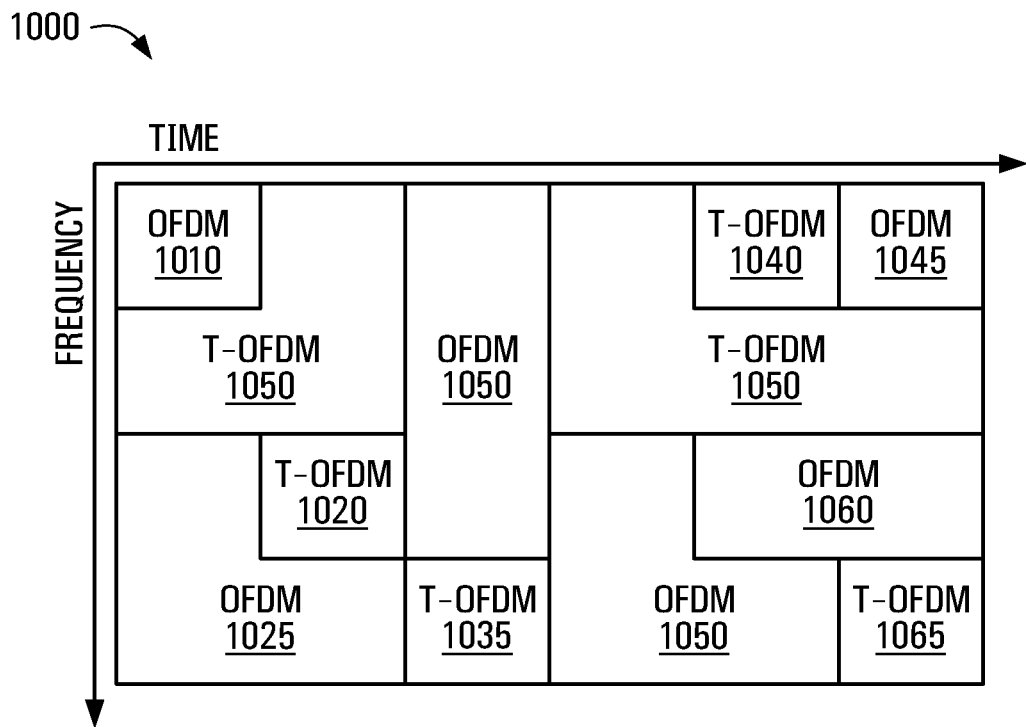
FIG. 12 is a schematic diagram of a transmission frame according to a further embodiment of the invention.

In FIG. 12, an example frame 1000 is shown for implementing a time and frequency multiplexing scheme in accordance with some embodiments of the invention. The frame 1000 is segmented into zones of different size and shape in both time and frequency. Examples of OFDM zones are indicated by 1010, 1025, 1030, 1045, 1055, 1060 and T-OFDM zones are indicated by 1015, 1020, 1035, 1040, 1050, 1065.

The number of zones and manner in which the zones are distributed in the frame are implementation specific parameters. Furthermore, the size of the transmission band, the duration of the time slots and the number of time slots in the frame are all implementation specific parameters as well. The assignment of zones to OFDM and T-OFDM is also implementation specific, where the assignment of OFDM and T-OFDM zones can take any desired arrangement. In some embodiments, the arrangement of zones can vary from frame to frame. In other embodiments consecutive frames may transmit the same arrangement of zones. In the example of FIG. 12, the two dimensional resource is divided into regions that are used for OFDM, and regions used for transformed OFDM (TOFDM). A similar frame (not shown) could be implemented to subdivide the frame into OFDM regions and regions containing direct multiple sub-carrier multiplexing and/or regions containing conventional FDM signals.

FIG. 12 can be implemented by a multi-carrier OFDM transmitter adapted to transmit both OFDM and T-OFDM. Examples of such OFDM transmitters are shown in FIGS. 8 and 9 and described above.

Figure 13:
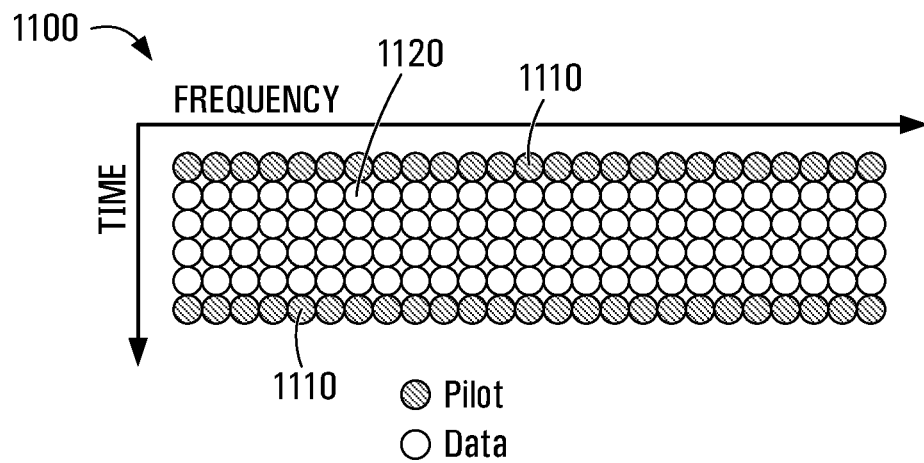
FIG. 13 is a schematic diagram of a pilot pattern for FDM according to an embodiment of the invention.

FIG. 13 shows an example pattern of a pilot design that can be used with some embodiments of the invention. In FIG. 13, time is shown in the vertical direction and frequency is shown in the horizontal direction. Each circle in the pattern represents content of a particular sub-carrier transmitted at a particular time. A horizontal row of such circles represents the sub-carriers transmitted in one or more symbols in a particular time slot. A vertical column represents the contents transmitted on a given scheduled sub-carrier over time. There are a finite number of sub-carriers in the frequency direction. It is to be understood that the number of sub-carriers in a symbol is a design parameter and that FIG. 11 is to be considered to give only one example of a particular size of a symbol.

In FIG. 13 pilots are generally indicated by 1110. Each sub-carrier in a first time slot transmits a pilot and each sub-carrier in a sixth scheduled time slot transmits a pilot. Data, generally indicated by 1120, is transmitted on each subcarrier of second to fifth time slots. The data portion of the frame is transmitted using any of the mechanisms described above, so as to allow both OFDM and T-OFDM, to coexist. A particular pilot pattern has been shown in which every first time slot and every fifth time slot thereafter is used for pilots. More generally, many different approaches to inserting pilots can be employed that may insert the pilots in the middle of frames, the end of frames, or in a scattered manner to name a few specific examples.

In some implementations pilots are inserted in the frequency domain in particular sequences to modulate pilot subcarriers to reduce PAPR. Pilots and data may be transmitted by different OFDM symbols. In some implementations, distributed pilots are used for T-OFDM such that the same frequency indexes are used for pilots and data for each sequence of samples from different users transmitting in the transmission band. In some implementations sub-band based pilots are used for T-OFDM such that same frequency indexes are used for pilots and data for each user transmitting in the transmission band.

In some embodiments, a pilot is implemented as a time domain training sequence. This can be transmitted during a reference symbol at the beginning, middle or end of frame for example. The reference symbols can include a training sequence from a single receiver or training sequences from multiple receivers. In some implementations, the training sequence is selected to be a sequence with a low PAPR.

Figure 14:
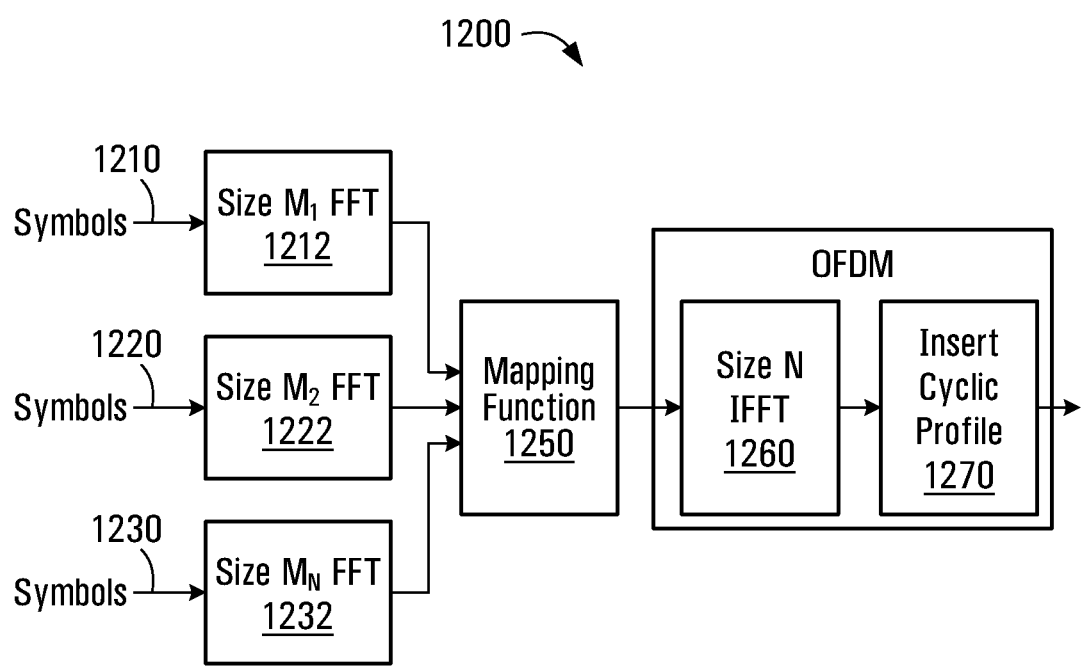
FIG. 14 is a block diagram of an OFDM transmitter according to embodiment of the invention.

Reference to FIG. 14 will now be made in describing an arrangement for an OFDM transmitter 1200 in accordance with an embodiment of the invention. A sequence of symbols for each of a plurality of users is applied to a respective processing block to calculate a FFT for that sequence of symbols, the FFTs being specific examples of transform functions. Symbols 1210 for a first user (not shown) are provided to a first FFT processing block 1212, symbols 1220 for a second user (not shown) are provided to a second FFT processing block 1222 and symbols 1230 for a third user (not shown) are provided to a third FFT processing block 1232. Outputs of each of the three processing blocks 1212, 1222, 1232 are provided to a mapping function 1250. An output of the mapping function 1250 is provided to an N sample size IFFT processing block 1260. An output of the IFFT processing block 1260 is provided to block 1270 in which a cyclic prefix is incorporated into the output of the IFFT processing block 1260.

The FFT processing blocks 1212, 1222, 1232 are shown to have FFT sample sizes of M1, M2 and MN, respectively. In some embodiments the sample sizes are the same (M1=M2=MN) in all three FFT processing blocks 1212, 1222, 1232. In some embodiments the sample sizes are different for the three FFT processing blocks 1212, 1222, 1232. Equivalently, the three FFT processing blocks 1212, 1222, 1232 could be implemented as a single large matrix containing three sub-matrices.

Only three FFT processing blocks 1212, 1222, 1232 are shown in the example of FIG. 14. However, it is to be understood that the number of FFT processing blocks is an implementation specific parameter.

In operation, each FFT processing block 1212, 1222, 1232 performs the respective sample size FFT on the sequence of symbols with which it is provided. The mapping function 1250 applies a mapping to the FFT processed sequence of symbols of each user depending on whether sub-band transformed OFDM or diversity transformed OFDM is being employed. For diversity transformed OFDM, the mapping function 1250 distributes the FFT processed sequence of symbols for each sequence to sub-carriers across the transmission band, such that two sequences are not mapped to the same sub-carrier. For sub-band transformed OFDM, the mapping function 1250 maps the FFT processed sequence of symbols for each sequence within a grouping of contiguous sub-carriers in transmission band, such that two sequences are not mapped to the same grouping of sub-carriers. The output of the mapping function 1250 is provided to the N sample size IFFT processing block 1260 and the IFFT transforms a frequency spectrum of the transmission band into a time sequence of symbols. The block 1270 incorporates the cyclic prefix into the time sequence of symbols prior to transmission.

In some embodiments, a sum of the multiple M sample size FFT outputs of the FFT processing blocks 1212, 1222, 1232 equals a number of samples N, which is the same as the number of samples in the N sample size IFFT. In other embodiments the sum of the multiple M sample size FFT outputs of the FFT processing blocks 1212, 1222, 1232 does not equal the number of samples N. In some embodiments the number of samples is expanded or padded to equal N samples before being applied to the N sample size IFFT processing block 1260.

In some implementations the OFDM transmitter includes additional processing elements between the FFT processing blocks 1212, 1222, 1232 and the IFFT processing block 1260. An example of an additional processing element is a sample size expander to match the number of samples of the FFT processing blocks 1212, 1222, 1232 to the number of samples of the N sample size IFFT processing block 1260. Another example of an additional processing element is a pulse shaping element to further reduce the PAPR of the transmission.

In some embodiments of the invention access air interface selection may be based on the PA (power amplifier) backoff room.

FIGS. 15 to 19 provide context for the above embodiments. Shown are specific examples of known implementations for OFDM transmitters. Many of the features shown in these figures may be included in systems that implement one or more of the constituent multiplexing structures described above.

Figure 15:
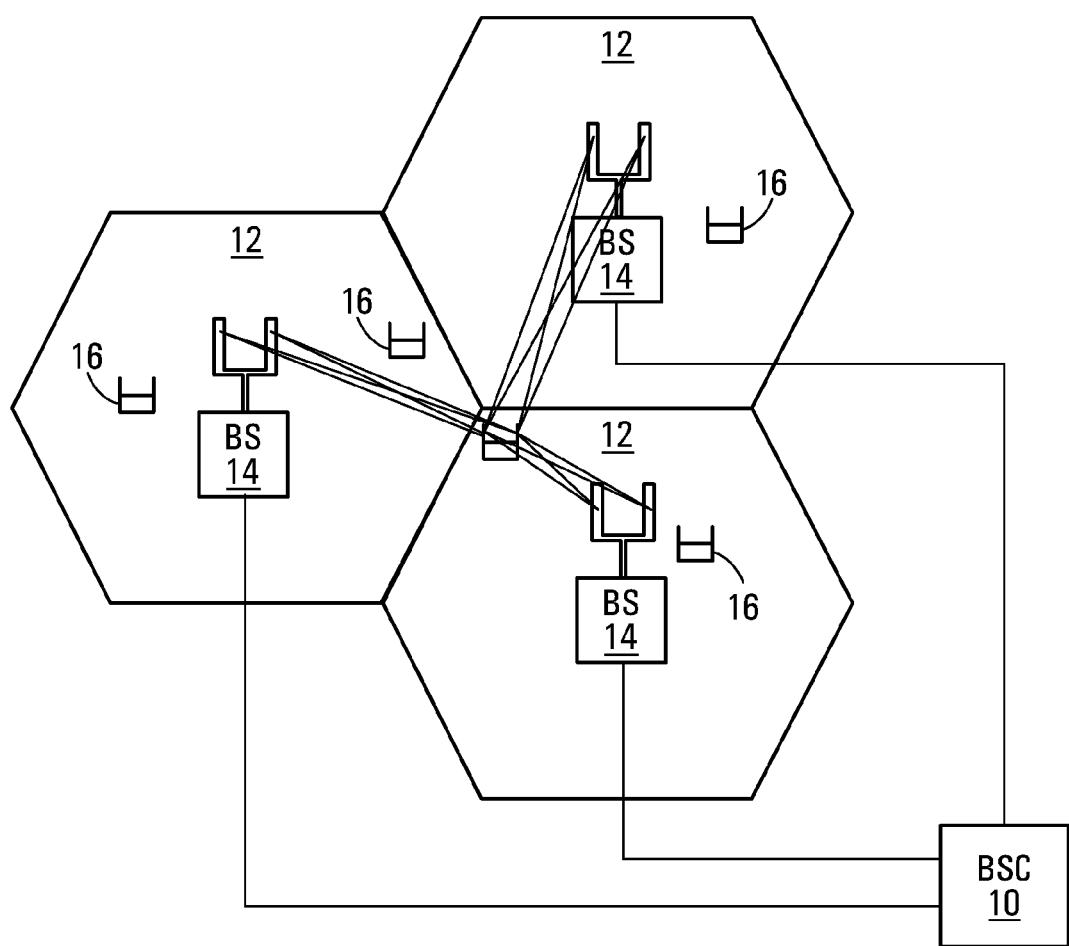
FIG. 15 is a block diagram of a cellular communication system.

For the purposes of providing context for embodiments of the invention for use in a communication system, FIG. 15 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 16:
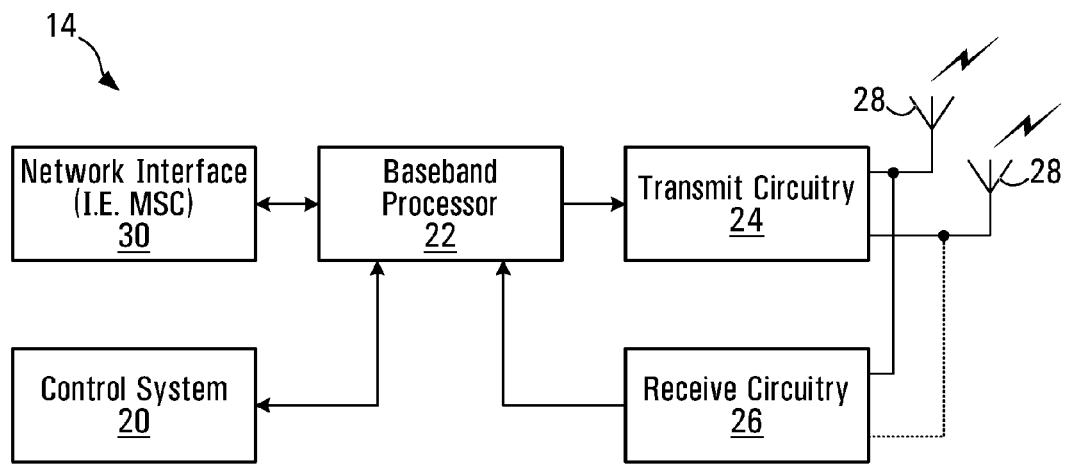
FIG. 16 is a block diagram of an example base station that might be used to implement some embodiments of the present invention.

A high level overview of the mobile terminals 16 and base stations 14 upon which aspects of the present invention may be implemented. With reference to FIG. 16, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 15). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data symbols conveyed in the received signal. This processing may comprise demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 17:
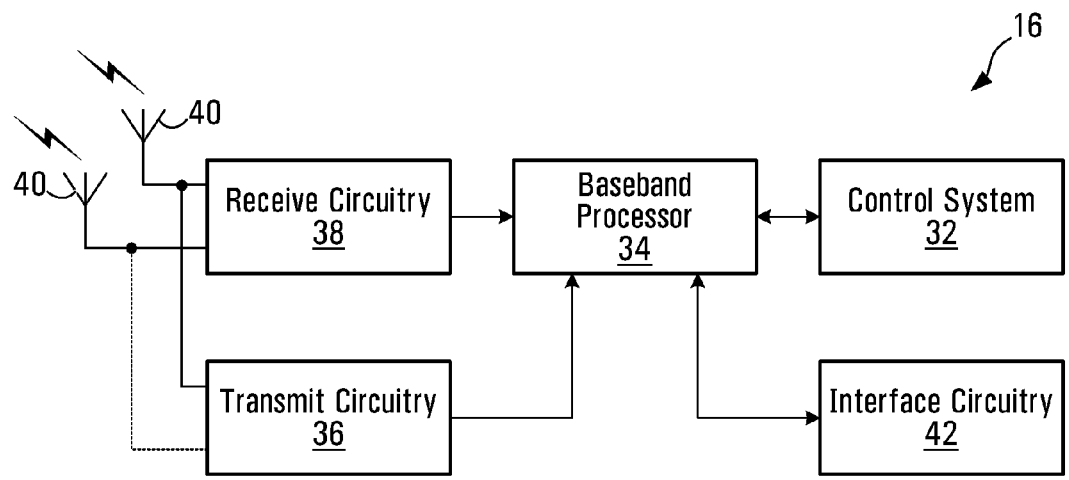
FIG. 17 is a block diagram of an example wireless terminal that might be used to implement some embodiments of the present invention.

With reference to FIG. 17, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data symbols conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In operation, OFDM may be used for the uplink and or the downlink transmission between the base stations 14 to the mobile terminals 16. Each base station 14 is equipped with "n">=1 transmit antennas 28, and each mobile terminal 16 is equipped with "m">=1 receive antennas 40. Notably, the respective antennas can be used for reception and transmission using appropriate duplexers or switches and are so labeled only for clarity.

Figure 18:
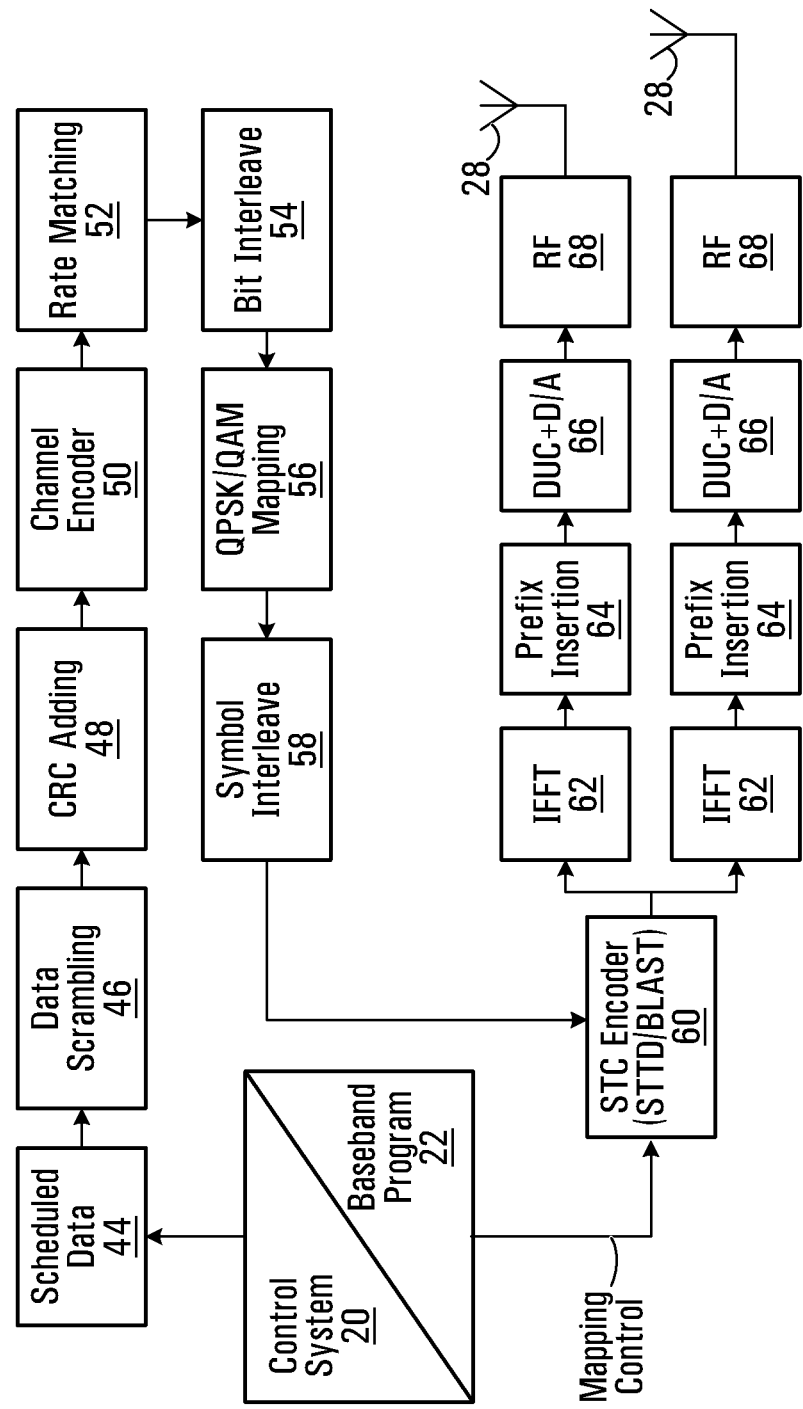
FIG. 18 is a block diagram of a logical breakdown of an example OFDM transmitter architecture that might be used to implement some embodiments of the present invention.

With reference to FIG. 18, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of symbols, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. In some embodiments, Quadrature Amplitude Modulation (QAM) or Quadrature Phase Shift Key (QPSK) modulation is used. The degree of modulation may be chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 2 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT function 62, illustrated separately for ease of understanding. Those skilled in the art will recognize that one or more processors may be used to provide such digital signal processing, alone or in combination with other processing described herein. The IFFT functions 62 will operate on the respective symbols to provide an inverse Fourier Transform. The output of the IFFT functions 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 19:
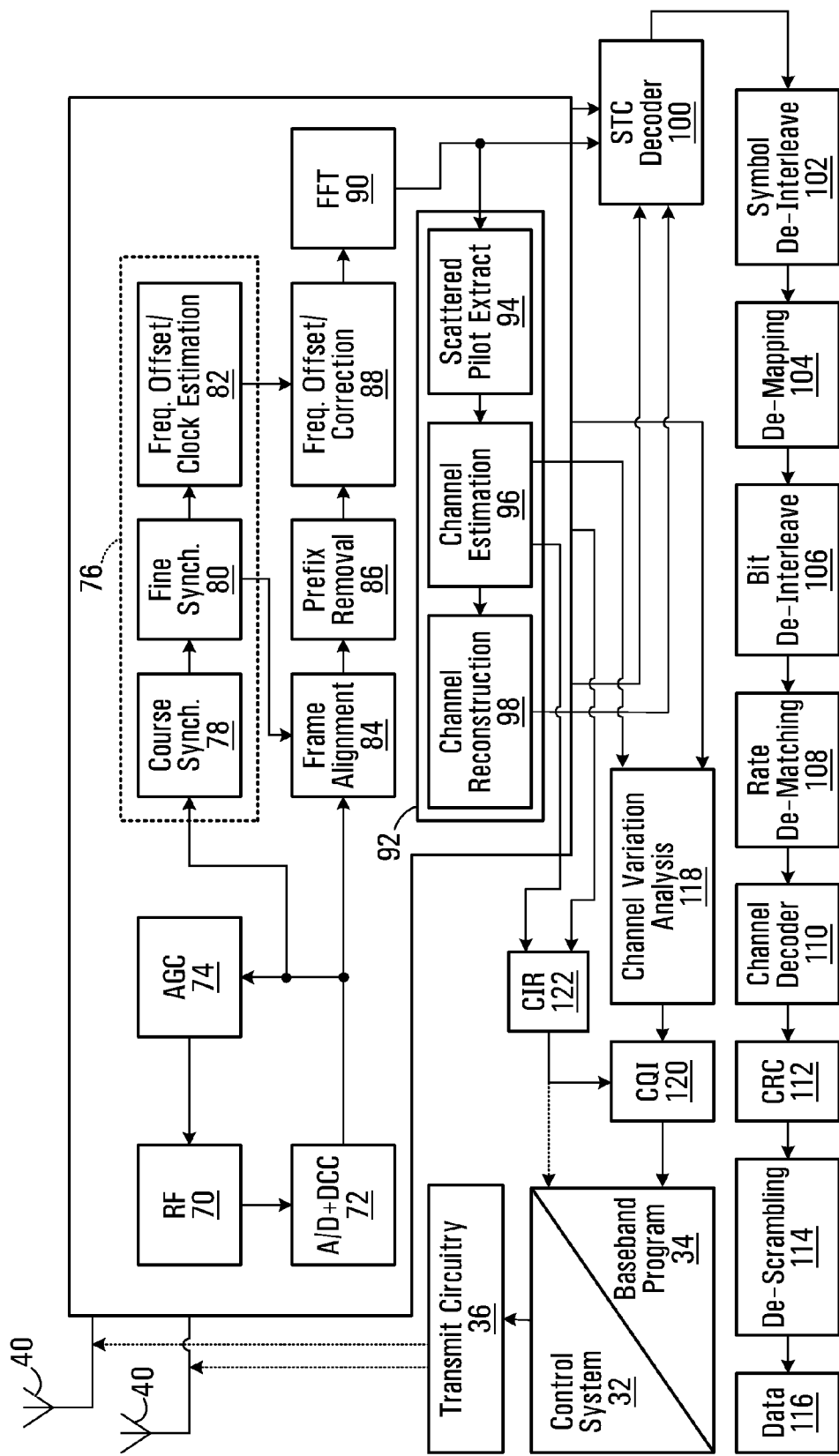
FIG. 19 is a block diagram of a logical breakdown of an example OFDM receiver architecture that might be used to implement some embodiments of the present invention.

Reference is now made to FIG. 19 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. The synchronization logic 76 may include frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the subcarriers, the pilot signal is essentially multiple pilot symbols that are scattered among the data symbols throughout the OFDM subcarriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 19, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The deinterleaved symbols are then demodulated or de-mapped to a corresponding bitstream using de-mapping logic 104. The bits are then deinterleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each subcarrier throughout the OFDM frequency band being used to transmit data.

FIGS. 15 to 19 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

Numerous modifications and variations of the present invention are possible in light of the above teachings. It is therefore to be understood that within the scope of the appended claims, the invention may be practiced otherwise than as specifically described herein.

What is claimed is:

1. A wireless communication system, comprising:
an antenna;
a baseband processor configured to apply a discrete Fourier transform (DFT) transformation to a first plurality of symbols conforming to a first traffic type to obtain an intermediate set of symbols, and perform an inverse Fast Fourier transform (IFFT) on a first mapped set of symbols corresponding to the intermediate set of symbols to produce a set of transformed orthogonal frequency-division multiplexing (OFDM) signals;
transmit circuitry coupled to the baseband processor and configured to receive the transformed OFDM signals and transmit a first signal using the transformed OFDM signals via the antenna;
wherein the baseband processor is further configured to perform an inverse Fast Fourier transform (IFFT) on a second mapped set of symbols corresponding to a second plurality of symbols conforming to a second traffic type to generate non-transformed OFDM signals, wherein, in generating the non-transformed OFDM signals, the baseband processor does not apply a DFT transformation; and
wherein the transmit circuitry is further configured to receive the non-transformed OFDM signals and transmit a second signal using the non-transformed OFDM signals via the antenna.

2. The wireless communication system of claim 1, wherein the second traffic type corresponds to a control channel, wherein the first traffic type does not correspond to the control channel.

3. The wireless communication system of claim 1, wherein the second traffic type corresponds to control information, wherein the first traffic type corresponds to non-control information.

4. The wireless communication system of claim 1, wherein the first traffic type corresponds to data modulation symbols, wherein the second traffic type corresponds to pilot sequence symbols.

5. The wireless communication system of claim 1, wherein the first plurality of symbols is transmitted at a first time, wherein the second plurality of symbols is transmitted at a second time.

6. The wireless communication system of claim 1, wherein the wireless communication system is a mobile terminal.

7. The wireless communication system of claim 1, wherein the wireless communication system is a base station.

8. The wireless communication system of claim 1, wherein the each of first and second traffic types do not correspond to pilot sequence symbols.

9. A method for operating a wireless communication system, the method comprising:
- applying, by the baseband processor, a discrete Fourier transform (DFT) transformation to a first plurality of symbols conforming to a first traffic type to obtain an intermediate set of symbols;
- generating, by the baseband processor, a first mapped set of symbols corresponding to the intermediate set of symbols;
- performing, by the baseband processor, an inverse Fast Fourier transform (IFFT) on the first mapped set of symbols to produce a set of transformed orthogonal frequency-division multiplexing (OFDM) signals;
- transmitting, by the baseband processor via transmit circuitry of the wireless communication system, the transformed OFDM signals using one or more antennae;
- generating, by the baseband processor, a second mapped set of symbols corresponding to a second plurality of symbols conforming to a second traffic type;
- performing, by the baseband processor, an inverse Fast Fourier transform (IFFT) on the second mapped set of symbols to generate non-transformed OFDM signals, wherein, in generating the non-transformed OFDM signals, a DFT transformation is not applied to the second plurality of symbols; and
- transmitting, by the base band processor via the transmit circuitry of the wireless communication system, the non-transformed OFDM signals using the one or more antennae.

10. The method of claim 9, wherein the second traffic type corresponds to a control channel, wherein the first traffic type does not correspond to the control channel.

11. The method of claim 9, wherein the second traffic type corresponds to control information, wherein the first traffic type corresponds to non-control information.

12. The method of claim 9, wherein the first traffic type corresponds to data modulation symbols, wherein the second traffic type corresponds to pilot sequence symbols.

13. The method of claim 9, wherein the first plurality of symbols is transmitted at a first time, wherein the second plurality of symbols is transmitted at a second time.

14. The method of claim 9, wherein the wireless communication system is a mobile terminal.

15. The method of claim 9, wherein the wireless communication system is a base station.

16. An apparatus, comprising:
- a baseband processor configured to receive a first plurality of symbols conforming to a first traffic type, apply a discrete Fourier transform (DFT) transformation to the first plurality of symbols to obtain an intermediate set of symbols, and perform an inverse Fast Fourier transform (IFFT) on a first mapped set of symbols corresponding to the intermediate set of symbols to produce a set of transformed orthogonal frequency-division multiplexing (OFDM) signals;
- wherein the baseband processor is further configured to output the transformed OFDM signals to transmit circuitry for transmission;
- wherein the baseband processor is further configured to receive a second plurality of symbols conforming to a second traffic type and perform an inverse Fast Fourier transform (IFFT) on a second mapped set of symbols corresponding to the second plurality of symbols to produce non-transformed OFDM signals, wherein producing the non-transformed OFDM signals does not include applying the DFT transformation; and
- wherein the baseband processor is further configured to output the non-transformed OFDM signals to transmit circuitry for transmission.

17. The apparatus of claim 16, wherein the second traffic type corresponds to a control channel, wherein the first traffic type does not correspond to the control channel.

18. The apparatus of claim 16, wherein the second traffic type corresponds to control information, wherein the first traffic type corresponds to non-control information.

19. The apparatus of claim 16, wherein the first traffic type corresponds to data modulation symbols, wherein the second traffic type corresponds to pilot sequence symbols.

20. The apparatus of claim 16, wherein the transformed OFDM signals are transmitted at a first time, wherein the non-transformed OFDM signals are transmitted at a second time.

* * * * *